(12) United States Patent
Jarrier

(10) Patent No.: US 8,540,805 B2
(45) Date of Patent: Sep. 24, 2013

(54) FILTER ASSEMBLY FOR USE IN A TURBINE SYSTEM

(75) Inventor: Etienne René Pascal Jarrier, Basingstoke (GB)

(73) Assignee: General Electric Company, Schenectady, NY (US)

( * ) Notice: Subject to any disclaimer, the term of this patent is extended or adjusted under 35 U.S.C. 154(b) by 265 days.

(21) Appl. No.: 12/943,508

(22) Filed: Nov. 10, 2010

(65) Prior Publication Data

US 2012/0110963 A1 May 10, 2012

(51) Int. Cl.
*B01D 46/30* (2006.01)

(52) U.S. Cl.
USPC ............ 95/273; 55/378; 55/498; 55/502; 55/508; 55/DIG. 5

(58) Field of Classification Search
USPC ............ 55/467, 498, 521, 341.1, 482, 484, 55/492, 502, 505, 508, 374, 376, 377, 378, 55/379, 372, 341.2; 95/286, 287, 2; 96/134
See application file for complete search history.

(56) References Cited

U.S. PATENT DOCUMENTS

| | | | |
|---|---|---|---|
| 3,406,502 A * | 10/1968 | Wiik | 55/341.1 |
| 4,303,417 A | 12/1981 | Koch, II | |
| 4,443,237 A * | 4/1984 | Ulvestad | 55/379 |
| 4,445,915 A * | 5/1984 | Robinson | 55/378 |
| 4,622,050 A | 11/1986 | O'Connor | |
| 4,723,969 A | 2/1988 | DeMarco | |
| 4,820,315 A | 4/1989 | DeMarco | |
| 4,963,172 A | 10/1990 | DeMarco | |
| 5,292,432 A | 3/1994 | Jainek et al. | |
| 5,674,303 A | 10/1997 | Ter Horst | |
| 5,985,160 A | 11/1999 | DiLeo et al. | |
| 6,203,591 B1 * | 3/2001 | Clements et al. | 55/341.1 |
| 6,273,925 B1 | 8/2001 | Alvin et al. | |
| 6,308,836 B1 | 10/2001 | Guichaoua et al. | |
| 6,543,625 B1 | 4/2003 | Le Roux et al. | |
| 7,252,704 B2 | 8/2007 | Tokar et al. | |
| 7,294,163 B1 * | 11/2007 | LaCroix | 55/498 |
| 7,438,736 B1 * | 10/2008 | Grey | 55/341.2 |
| 7,513,925 B2 | 4/2009 | Thomas et al. | |
| 8,114,201 B2 * | 2/2012 | Gebert et al. | 96/134 |
| 2004/0103626 A1 * | 6/2004 | Warth et al. | 55/467 |
| 2006/0032197 A1 * | 2/2006 | Pyron | 55/372 |
| 2006/0091064 A1 | 5/2006 | Brown et al. | |
| 2006/0254229 A1 * | 11/2006 | Schrage et al. | 55/498 |
| 2007/0266681 A1 * | 11/2007 | Grey et al. | 55/378 |
| 2010/0024370 A1 * | 2/2010 | Jones et al. | 55/498 |
| 2010/0024639 A1 * | 2/2010 | Taylor | 95/2 |

FOREIGN PATENT DOCUMENTS

DE 19 806 929 A1 8/1999

OTHER PUBLICATIONS

Search Report issued in connection with British Patent Application No. 1119096.4, Mar. 5, 2012.

* cited by examiner

*Primary Examiner* — Duane Smith
*Assistant Examiner* — Minh-Chau Pham
(74) *Attorney, Agent, or Firm* — Armstrong Teasdale LLP

(57) ABSTRACT

In one aspect, a method for assembling a filtration system is provided. The method includes providing a filter including a retainer formed therewith. The method also includes coupling a gasket about the retainer such that the gasket circumscribes the retainer, such that the gasket is integrally formed with a clamp and such that the clamp is coupled to the retainer in a friction fit.

17 Claims, 5 Drawing Sheets

FILTER ASSEMBLY FOR USE IN A TURBINE SYSTEM

BACKGROUND OF THE INVENTION

The field of the invention relates generally to a filter assembly for use in a turbine system, and more particularly, to a filter assembly for use in a gas turbine engine.

Fabric filtration is a common technique for use in removing particulate matter from an air stream in a turbine engine. Such filters are often used in known baghouses. Known baghouses may include a housing that includes an inlet that receives dirty, particulate-containing air and an outlet through which clean air is discharged from the baghouse. In such baghouses, often the interior of the housing is divided by a tube sheet, into a dirty air or upstream plenum, and a clean air or downstream plenum. Air flows through the inlet located in the dirty air plenum, through the filters and into the clean air plenum before leaving through the outlet of the clean air plenum. Known tube sheets are formed with a number of apertures, and support a plurality of filter elements that each extend about one of the apertures.

At least some known filter elements include a hollow support structure and a fabric filter media. In some of such filter elements, the support structure, which is also called a core, typically has a cylindrical shape that is defined by walls that include perforations that enable a fluid to pass therethrough. At least one end of the support structure is open and is coupled to the tube sheet such that the support structure extends about an aperture defined in the tube sheet into the dirty air plenum. Gaskets or filter seals are used to prevent air from flowing between the upstream and downstream side of the filter media in such a manner that the flow by-passes the filter element.

Generally, known filter seals are rigidly coupled to the filter with an adhesive. However, during installation, if the filter is inadvertently bumped, the rigid connection between the filter and filter seal may become weakened. Moreover, continued exposure to high temperature fluid flows over time, may weaken the effectiveness of and/or degrade the adhesive. Continued operation with a weakened bond between the filter and filter seal, may enable air to by-pass the filter elements and thus lessen the effectiveness of the baghouse.

BRIEF DESCRIPTION OF THE INVENTION

In one aspect, a method for assembling a filtration system is provided. The method includes providing a filter including a retainer formed therewith. The method also includes coupling a gasket about the retainer such that the gasket circumscribes the retainer, such that the gasket is integrally formed with a clamp and such that the clamp is coupled to the retainer in a friction fit.

In another aspect, a filtration system including a filter assembly is provided. The filter assembly includes a filter including a retainer and a gasket circumscribing the retainer. The gasket includes a clamp formed integrally within the gasket, such that the clamp is configured to couple to the retainer in a friction fit.

In another aspect, a filter assembly for use with a filtration system is provided. The filter assembly includes a filter for filtering particulate in a gas turbine system including a retainer and a gasket circumscribing the retainer. The gasket includes a clamp formed integrally within the gasket, such that the clamp is configured to couple to the retainer in a friction fit.

DETAILED DESCRIPTION OF THE INVENTION

Figure 1:
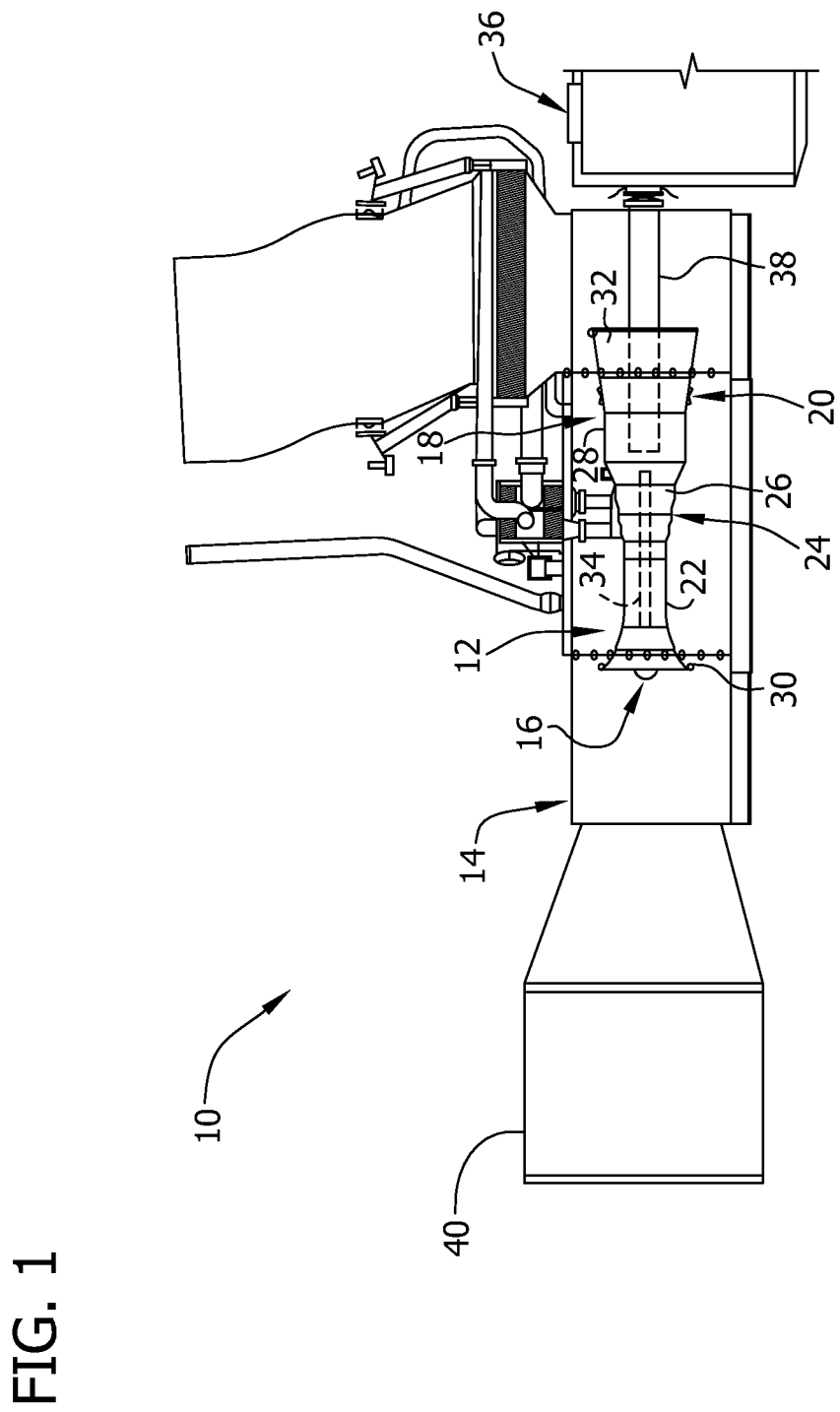
FIG. 1 is a schematic illustration of an exemplary turbine engine assembly.

FIG. 1 is a schematic illustration of an exemplary turbine engine assembly 10 that includes a turbine engine 12 positioned in a housing 14. Turbine engine 12 includes an inlet portion 16, an engine portion 18, and an exhaust portion 20. In the exemplary embodiment, turbine engine 12 is a gas turbine engine. Engine portion 18 includes at least one compressor 22, a combustor 24, a high pressure turbine 26, and a low pressure turbine 28 serially coupled together in flow communication. Inlet portion 16 includes an inlet 30, and exhaust portion 20 includes an exhaust nozzle 32. Turbine engine 12 may be any known turbine engine. In the exemplary embodiment, compressor 22 and high pressure turbine 26 are coupled together by a first shaft 34, and low pressure turbine 28 and a driven load 36, for example, an electric generator, are coupled together by a second shaft 38. Moreover, in the exemplary embodiment, an inlet air plenum or baghouse 40 is coupled in flow communication to air inlet 30.

In operation, air flows from baghouse 40 into engine inlet 30 through compressor 22 and is compressed. Compressed air is then channeled to combustor 24 where it is mixed with fuel and ignited. Airflow from combustor 24 drives rotating turbines 26 and 28 and exits gas turbine engine 12 through exhaust nozzle 32.

Figure 2:
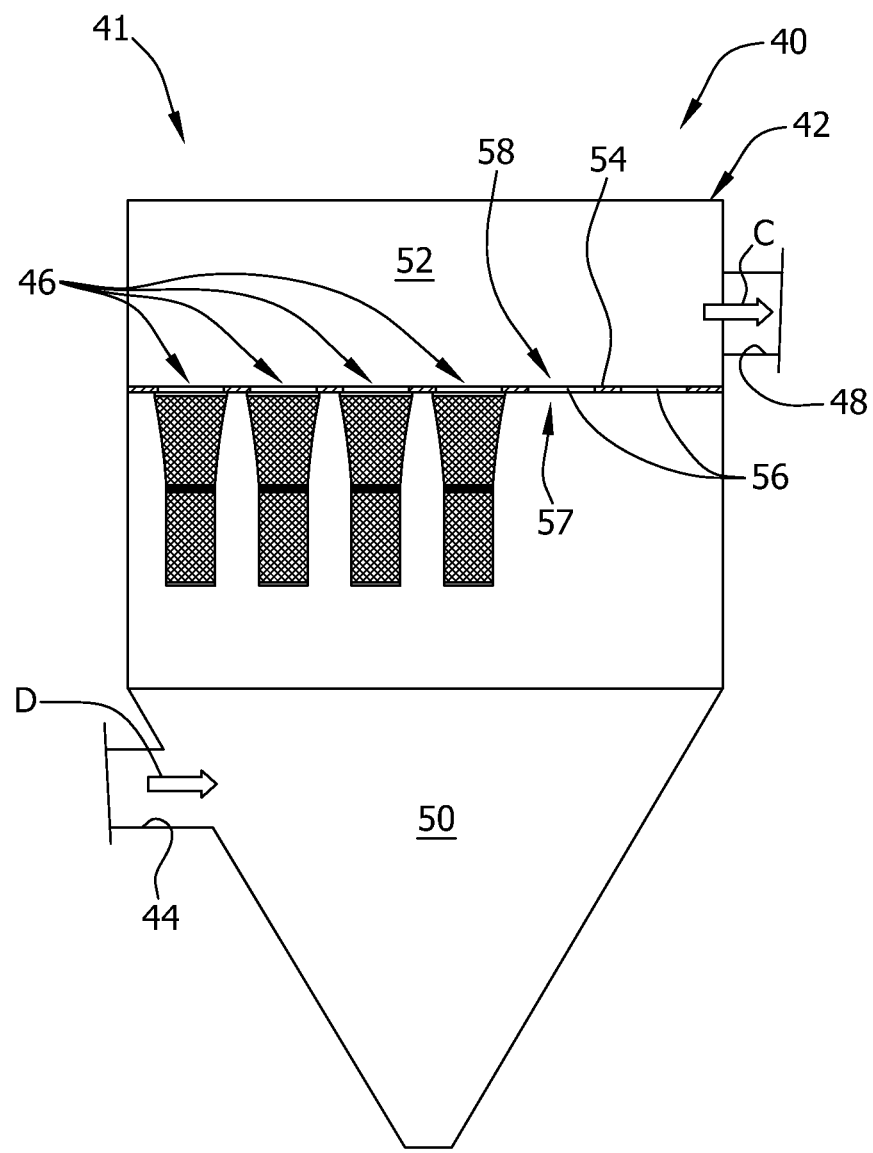
FIG. 2 is a schematic illustration of an exemplary filtration system that may be used with the turbine engine shown in FIG. 1.
Figure 3:
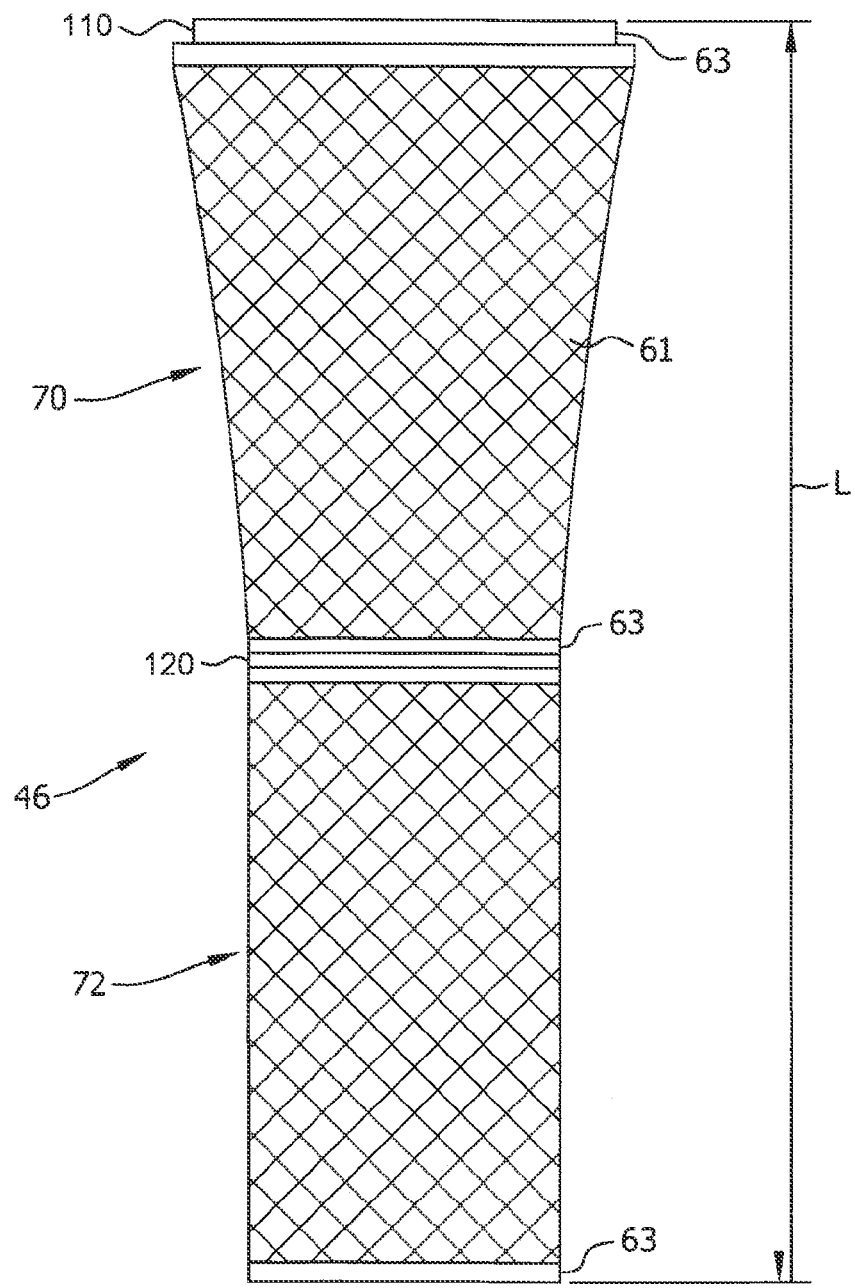
FIG. 3 is an enlarged schematic illustration of a filter assembly used with the filtration system shown in FIG. 2.

FIG. 2 is a schematic illustration of an exemplary filtration system 41 that is positioned in air plenum or baghouse 40 (shown in FIG. 1). FIG. 3 is an enlarged schematic illustration of a filter assembly 46 that may be used with filtration system 41 (shown in FIG. 2). In the exemplary embodiment, filtration system 41 is contained in baghouse 40. Baghouse 40 is defined by a housing 42 that includes an inlet 44 and an outlet 48 and divided into a dirty air plenum 50 and a clean air plenum 52 by a tube sheet 54. As used herein, the term dirty air/gas is defined as particulate-containing air/gas, and the term clean air/gas is defined as air/gas that has had substantially all particulate matter removed from the air/gas. Tube sheet 54 is fabricated from a heat-resistive material, such as sheet metal and includes at least a portion that is substantially planar and that is formed with openings 56 extending therethrough. In the exemplary embodiment, openings 56 are spaced substantially evenly across tube sheet 54.

Each filter assembly 46 is coupled within a respective opening 56. More specifically, each filter assembly 46 is coupled against tube sheet 54 such that each assembly 46 extends through a respective opening 56 defined in tube sheet 54. More specifically, when assemblies 46 ware each coupled to tube sheet 54, each assembly 46 is positioned against a dirty air side 57 of tube sheet 54, opposite a clean air side 58 of tube sheet 54. Moreover, when assembled, dirty gas plenum 50 is substantially isolated and is substantially sealed from clean gas plenum 52 other than through openings 56. Although, filter assemblies 46 are illustrated as being vertically-oriented, it should be noted that filter assemblies 46 could be mounted in any orientation that enables baghouse 40 to function as described herein.

In the exemplary embodiment, each filter assembly 46 includes a pleated filter media 61. Filter media 61 is formed into a tubular configuration that has a substantially circular cross-section profile. Alternatively, filter assemblies 46 may include any filter media that enables filter assembly 41 to function as described herein, including but not limited to, a pulse cartridge filter, a bag filter, and a minipleat v-cell filter.

Alternatively, filter media 61 may be formed in any shape or configuration that enables assemblies 46 to function as described herein. For example, filter assemblies 46 may be formed with any desired length L that enables the filtering requirements of baghouse 40 to be satisfied. In the exemplary embodiment, each filter assembly 46 includes a first filter 70 and a second filter 72 that are coupled substantially concentrically together in a serial flow arrangement such that first filter 70 is downstream from second filter 72.

In the exemplary embodiment, pleated filter media 61 circumscribes a support member 63 of filter assembly 46. More specifically, pleated filter media 61 circumscribes an outer periphery 64 of support member 63 and includes accordion folds that are formed along its outer and inner peripheries 64 and 65, respectively. Pleated filter media 61 may be constructed of any material that enables desired filtering to be satisfied based on the designed operating conditions of baghouse 40. For example, media 61 may be fabricated from materials that include, but not limited to only including, polyester, acrylic and/or polypropylene.

A first filter seal or gasket 110 is coupled to first filter 70 such that gasket 110 circumscribes a flange 66 of support member 63. A second filter seal or gasket 120 is coupled to second filter 72 such that gasket 120 circumscribes flange 66 of support member 63. Filter seals 110 and 120 may be fabricated from any material that substantially prevents the ingress or egress of air or water including, but not limited to, cellulose and rubber, such as neoprene.

During operation, particulate-laden gas flow D enters inlet 44, and clean gas flow C is discharged through outlet 48 towards turbine engine inlet 30 (shown in FIG. 1). More specifically, particulate-laden flow D is filtered by assemblies 46 positioned within baghouse 40 and clean flow C exits through an outlet 48 of baghouse 40. Dirty gas plenum 50 is substantially sealed from clean gas plenum 52 with filter assembly 46 such that flow communication therebetween is substantially prevented between dirty gas plenum 50 and clean gas plenum 52 except through assemblies 46. Support member 63 supports pleated filter media 61 as flow moves through filter assembly 46 during operation of baghouse 40.

Figure 4:
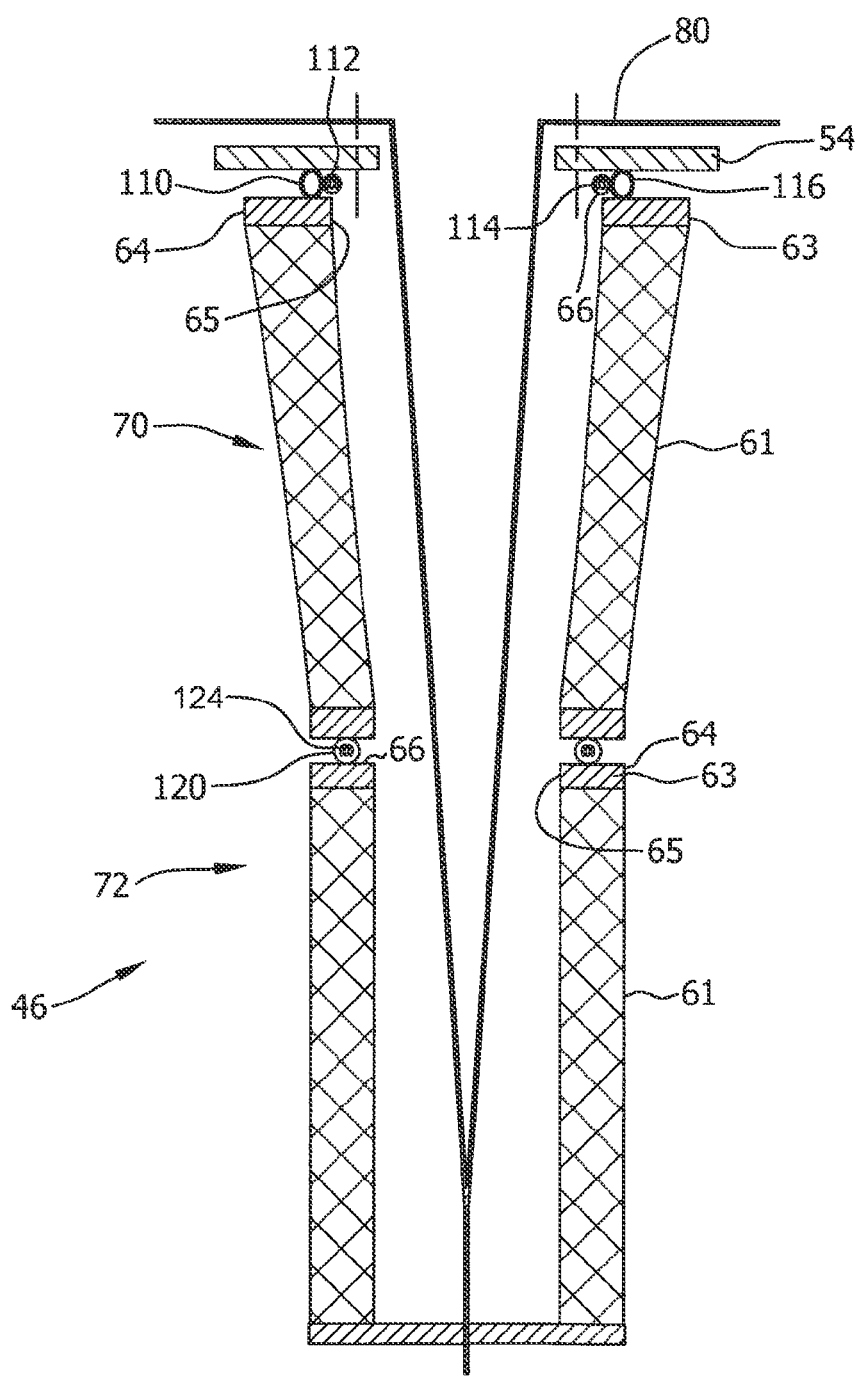
FIG. 4 is a cross-sectional view of an exemplary filter assembly that may be used with the filter assembly shown in FIG. 2.

FIG. 4 is a cross-sectional view of an exemplary filter assembly 46. In the exemplary embodiment, filter assembly 46 includes a first filter 70 that circumscribes second filter 72, and pleated filter media 61 that circumscribes filters 70 and 72. In the exemplary embodiment, first filter seal 110 is coupled to flange 66 of support member 63 of first filter 70, and second filter seal 120 is coupled to flange 66 of support member 63 of second filter 72 and circumscribes support member 63.

When filter assembly 46 is inserted in baghouse tube sheet 54, a tripod 80 is used to retain filter assembly 46 against tube sheet 54. In the exemplary embodiment, tripod 80 compresses first filter 70 against second filter 72, and similarly, compresses filter assembly 46 against tube sheet 54. Moreover, tripod 80, compresses filter assembly 46 to substantially prevent ingress and egress of water and air in between adjacent support members 63, and between support members 63 and tube sheet 54.

Figure 5:
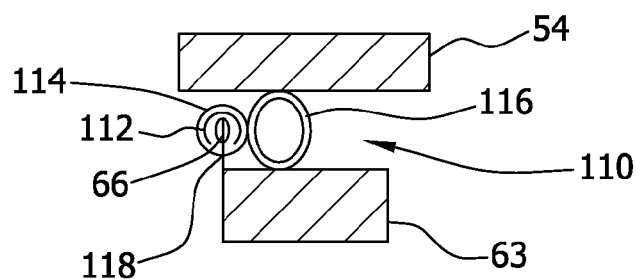
FIG. 5 is a cross-sectional view of an exemplary filter seal that may be used with the filter assembly shown in FIG. 4.
Figure 6:
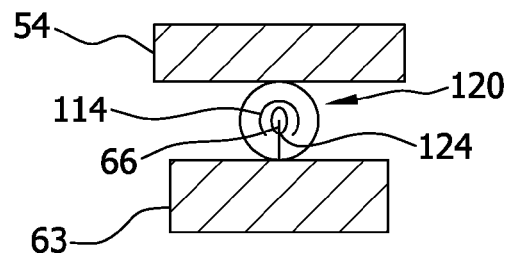
FIG. 6 is a cross-sectional view of an alternative filter seal that may be used with the filter assembly shown in FIG. 4
Figure 7:
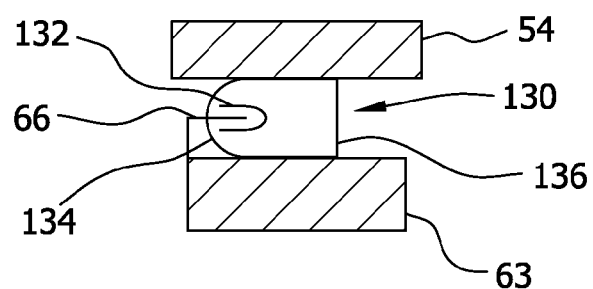
FIG. 7 is a cross-sectional view of an alternative filter seal that may be used with the filter assembly shown in FIG. 4

FIGS. 5, 6, and 7 are cross-sectional views of different exemplary filter seals 110, 120, and 130 (shown in FIG. 4). In the exemplary embodiment, first filter seal 110 includes a first seal member 114 that is coupled to a second seal member 116. First seal member 114 is substantially circular and includes an aperture 118 defined therein that is sized to receive a flange 66 of support member 63. In the exemplary embodiment, second seal member 116 is hollow and is larger than first seal member 114, and is sized and oriented to be inserted between support member 63 and tube sheet 54. Insert 112 is embedded in first seal member 114 in a U-shaped manner that enables a friction fit between support member 63 and flange 66. Insert 112 may be fabricated from any suitable material that enables the filter seals 110, 120, and 130 to be retained against support member 63 including, but not limited to, steel and stainless steel. Alternatively, seal members 114 and 116 may be fabricated in a solid configuration and have any cross-sectional shape that enables first filter seal 110 to function as described herein.

FIG. 6 is a cross-sectional view of an alternative filter seal 120 that may be used with filter assembly 46 (shown in FIG. 4). In the exemplary embodiment, second filter seal 120 is fabricated with a substantially circular body that includes an aperture 124 extending therethrough. Aperture 124 is sized to receive flange 66 of therein. Insert 112 is embedded in second seal member 120 in a U-shaped manner that enables a friction fit between support member 63 and flange 66.

FIG. 7 is a cross-sectional view of another alternative filter seal 130 that may be used with filter assembly 46 (shown in FIG. 4). In the exemplary embodiment, filter seal 130 is a solid seal. Alternatively, at least a portion of filter seal 130 may be hollow. In the exemplary embodiment, filter seal 130 includes a rounded edge 134 that is sized and shaped to receive support member 63. Insert 132 is embedded in filter seal 130 in a U-shaped orientation that enables a friction fit between support member 63 and flange 66. In the exemplary embodiment, filter seal 130 also includes a substantially planar edge 136 opposite rounded edge 134. Alternatively, edges 134 and 136 of filter seal 130 can have any shape that enables filter seal 110 to function as described herein including, but not limited to, straight, concave, and convex.

An exemplary benefit of fabricating a filter assembly using a tripod and seals, such as seals 110, 120, and/or 130, and as detailed herein, is that no additional materials are needed to couple a filter seal to the filter. In contrast, at least some known filter seals use either an adhesive or a mechanical fitting to couple the filter seal to the filter. In contrast, the seals described herein provide a cost-effective and highly reliable device for use within a filter assembly.

Exemplary embodiments of filter assembly for a turbine system are described above in detail. The methods and systems are not limited to the specific embodiments described herein, but rather, components of systems and/or steps of the methods may be utilized independently and separately from other components and/or steps described herein. For example, the methods may also be used in combination with other filtration systems and methods, and are not limited to practice with only the turbine systems and methods as described herein. Rather, the exemplary embodiment can be implemented and utilized in connection with many other filtration or sealing applications.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A method for assembling a filter, said method comprising:
   providing a filter including a retainer formed therewith; and
   coupling a gasket about the retainer such that the gasket circumscribes the retainer, wherein a clamp is embedded within the gasket, wherein the clamp comprises an aperture defined therein that is sized to receive the retainer such that the clamp is coupled to the retainer in a friction fit, and at least a portion of the retainer extends outward from the gasket.

2. A method for assembling a filter in accordance with claim 1 wherein coupling a gasket further comprises providing the gasket fabricated from at least a rubber composite material.

3. A method for assembling a filter in accordance with claim 1 wherein coupling a gasket further comprises providing the clamp formed integrally within the gasket from at least a metal composite.

4. A filtration system comprising:
   a filter assembly comprising:
   a filter including a retainer; and
   a gasket circumscribing the retainer, said gasket comprising a clamp embedded within said gasket, said clamp comprising an aperture defined therein sized to receive the retainer such that the clamp is configured to couple to the retainer in a friction fit, wherein at least a portion of the retainer extends outward from said gasket when the clamp is coupled to the retainer.

5. A filtration system in accordance with claim 4 wherein said gasket is fabricated from at least a rubber composite material.

6. A filtration system in accordance with claim 4 wherein the clamp is fabricated from at least a metal composite.

7. A filtration system in accordance with claim 4 wherein said gasket is configured to prevent air and fluid by-pass between an upstream and a downstream side of said filter.

8. A filtration system in accordance with claim 4 wherein said filter is a pulse cartridge filter.

9. A filtration system in accordance with claim 4 wherein said filter is a bag filter.

10. A filtration system in accordance with claim 4 wherein said filter is a minipleat v-cell filter.

11. A filter assembly for use with a filtration system, said filter assembly comprising:
    a filter for filtering particulate in a gas turbine system comprising a retainer; and
    a gasket circumscribing the retainer, said gasket comprising a clamp embedded within said gasket, said clamp comprising an aperture defined therein sized to receive the retainer such that the clamp is configured to couple to the retainer in a friction fit, wherein at least a portion of the retainer extends outward from said gasket when the clamp is coupled to the retainer.

12. A filter assembly in accordance with claim 11 wherein said gasket is fabricated from at least a rubber composite material.

13. A filter assembly in accordance with claim 11 wherein the clamp is fabricated from at least a metal composite.

14. A filter assembly in accordance with claim 11 wherein said gasket is configured to prevent air and fluid by-pass between an upstream and a downstream side of said filter.

15. A filter assembly in accordance with claim 11 wherein said filter is a pulse cartridge filter.

16. A filter assembly in accordance with claim 11 wherein said filter is a bag filter.

17. A filter assembly in accordance with claim 11 wherein said filter is a minipleat v-cell filter.

* * * * *